Figure 1:
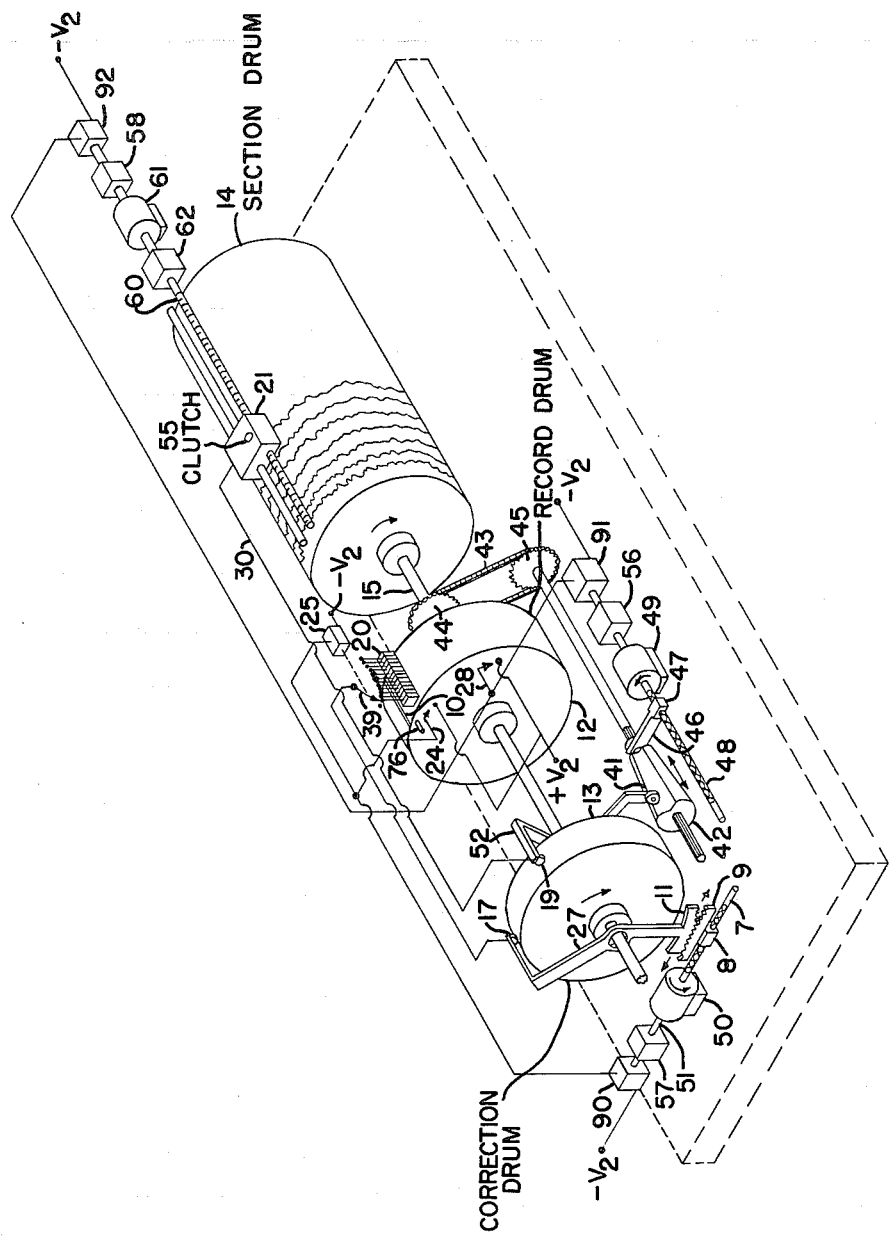

June 25, 1963  W. A. ALEXANDER ET AL  3,095,552
AUTOMATIC CORRECTION OF SEISMIC RECORDS
Filed Nov. 27, 1956  2 Sheets-Sheet 1

Warren A. Alexander
Robert L. Wilcox   Inventors

By James A. Reilly   Attorney

Warren A. Alexander
Robert L. Wilcox      Inventors

By James A. Reilly    Attorney

United States Patent Office 3,095,552
Patented June 25, 1963

3,095,552
AUTOMATIC CORRECTION OF SEISMIC
RECORDS
Warren A. Alexander and Robert L. Wilcox, Tulsa, Okla., assignors, by mesne assignments, to Jersey Production Research Company
Filed Nov. 27, 1956, Ser. No. 624,568
5 Claims. (Cl. 340—15.5)

This invention is broadly concerned with a system for correcting seismic records. More particularly, the invention is concerned with a system for preparing a corrected seismogram from uncorrected field records in which the corrections to the individual traces are entered automatically in response to a preselected program. The invention is particularly adapted for use in conjunction with apparatus in turn adapted to prepare a seismic section, preferably visual in character, from one or more reproducible-type seismograms. The invention enables such apparatus to operate in a substantially automatic manner, reproducing each trace from the seismogram in a predetermined sequence, automatically incorporating predetermined seismic corrections, and thereafter automatically recording the corrected trace information on a record medium in the form of a seismic section.

Geophysical prospecting procedures using artificially induced seismic disturbances have found wide application in the search for petroleum and other mineral deposits. In all of these methods it is general practice to initiate an explosion or other seismic disturbance at a point near the surface of the earth and to direct seismic waves downward into the earth from that point. The waves continue to travel downward within the earth, until they encounter discontinuities in the earth's structure in the form of various substrata, formations, and the like. The discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. Furthermore, by using accurate timing devices and recording means, it is possible to determine not only the magnitude of the signals received by the various geophones but also to measure the times required for the seismic waves to travel from the disturbance point down to the various discontinuities and thence to the geophones. By knowing this information and by measuring the distances between the various geophones and the seismic disturbance point and by further measuring or assuming velocities of seismic waves in the particular section of the earth under study, it is possible to calculate and determine the depths of the various discontinuities beneath the surface of the earth.

In ascertaining the depths of subterranean strata or other seismic reflection events, it is necessary to make two general classes of corrections in the original seismic data. First, it is necessary to make certain "static" corrections which are static or fixed quantities for each signal detected and recorded by a given geophone or transducer location. Corrections in this category include the height of a geophone relative to an assumed datum, the velocity of the seismic waves through a low velocity layer immediately adjacent the earth, the elevation of the disturbance or shot point relative to the datum, etc.

A second type of corrections that must be made to the seismic records are of the so-called "dynamic" or "variable" type in that the magnitude of the correction varies with time for the signals that are received by any given geophone or transducer location. This category of corrections includes the "spread" or "step-out" correction which is a function of the distance of a geophone location from a shot point; and it also includes any correction that is occasioned by variations in seismic velocity with depth in the section of the earth under study.

The earliest types of seismic recorders, i.e., means for recording the electrical signals generated by the seismic transducers, for the most part employed oscillographic-type pens or reflecting mirrors for generating oscillographic, ink or photographic traces on suitable recording media. Many recorders such as these are still used today, and a single unit may record the signals from as many as thirty or more geophone locations. In general, the trains of signals from each geophone location are recorded in a side-by-side relation on a moving recording paper or photosensitive film.

While the oscillographic trace recorders have proved to be very valuable in analyzing seismic data, they nevertheless have had serious disadvantages. For example, it has always been necessary to "pick" information or data from the records and to apply mathematical calculations to the data thus picked in order to obtain information concerning the reflections indicated on the records. Additionally the records themselves are rather difficult to study and interpret. In short, the records present a difficult problem for seismic interpreters, and they are both expensive and time consuming to study.

More recently, seismic recorders of a reproducible type have been developed; and these recorders are finding ever increasing application at the present time. These recorders derive their name from the fact that they receive electrical signals from geophone locations and transform these signals into variable intensity traces which are reproducible in character. Thus, the recorders may be of a photographic type in that they form traces of variable density or variable area characteristics. Alternatively, they may develop variable intensity magnetic traces on a magnetizable medium such as wire, tape or the like. In general, all reproducible recorders and traces are characterized by the fact that the trace information may be scanned by a suitable transducer to generate trains of electrical signals in response to the trace information on the reproducible recording medium. These recorders have been found to have very good fidelity in that the "seismic signals" reproduced from the records are generally very comparable with the electrical signals that are generated by the geophones at the geophone locations. And, as in the case of the oscillographic recorders, the individual traces on any record are generally in a side-by-side relation. The records are generally referred to as seismograms. It will be recognized that the reproduced signal must be demodulated to recover the "pure" seismic signal in the event that a carrier signal was modulated by the latter signal in the process of recording; and filters may be used as desired to emphasize certain signal frequencies.

Reproducible-type seismic recorders, and especially magnetic tape recorders, have been found to be especially valuable to the seismic interpreter. Not only may the records be played over and over without damage to the records, thus permitting considerable experimentation with the recordings; but they may also be processed by recently developed equipment to form directly observable seismic sections. In this connection variable density photographic sections have proven to be especially valuable and desirable in that they afford striking presentations of portions of the earth. The positions and types of subterranean strata reveal themselves very clearly in sections of this type.

The equipment that is used to prepare seismic sections from reproducible seismic records is popularly referred to as "playback" or "office playback" equipment in that it plays back the information on the original records to generate the resulting seismic section. Manually operated adjustments on the equipment enable the operator thereof to incorporate both static and dynamic corrections to each signal trace on the original records, so that the sections may be partially or completely corrected when completed.

It can be readily recognized that reproducible-type seismic recorders and playback units are invaluable in facilitating the problems of seismic recording and interpretation. It can further be recognized, however, that such equipment is both complex and expensive. Furthermore, while presently available play back equipment provides faster interpretation of seismic information than was previously possible; it should be noted that the present equipment is essentially manual in its operation, and it requires substantially the entire time of an operator.

In view of the important and yet expensive nature of seismic interpretation work, it is accordingly an object of this invention to provide improved apparatus for preparing seismic sections from reproducible type field seismic records or seismograms. It is also an object of the invention to increase the speed of operation of presently available office playback equipment and to reduce markedly the personnel time required to operate the equipment. It is a more particular object of the invention to render substantially automatic the operation of playback equipment and to reduce the time required for operating the equipment.

These and related objects, which will be expressly described or readily apparent from the description that follows, may be realized in accordance with this invention by the use of preprogramming and sequence control means adapted to automatically incorporate or otherwise apply predetermined seismic corrections to information as it is transposed from a seismogram into a seismic section. In other words, the corrective and other components of a playback system are provided with positioning and position selector means adapted to incorporate the desired and necessary corrections to each reproduced seismic trace and in a sequence to agree with the sequence in which the traces are reproduced. The positioning means causes the corrections to any given trace to be incorporated within the trace; the programming or selector means enables the operator to preprogram the corrections in the order in which the traces are to be reproduced; and the sequence control means designates the order in which the traces are played.

The invention may be better understood by reference to the attached drawing in which:

FIGURE 1 illustrates in a perspective view the essential components of commercially available playback equipment adapted to produce a visual-type multi-trace seismic section from a multi-trace reproducible record of the magnetic tape type. The apparatus in this figure is illustrated as it would be modified by a preferred embodiment of the present invention. It further illustrates the best mode contemplated for carrying out the objects of the invention.

Figure 2:
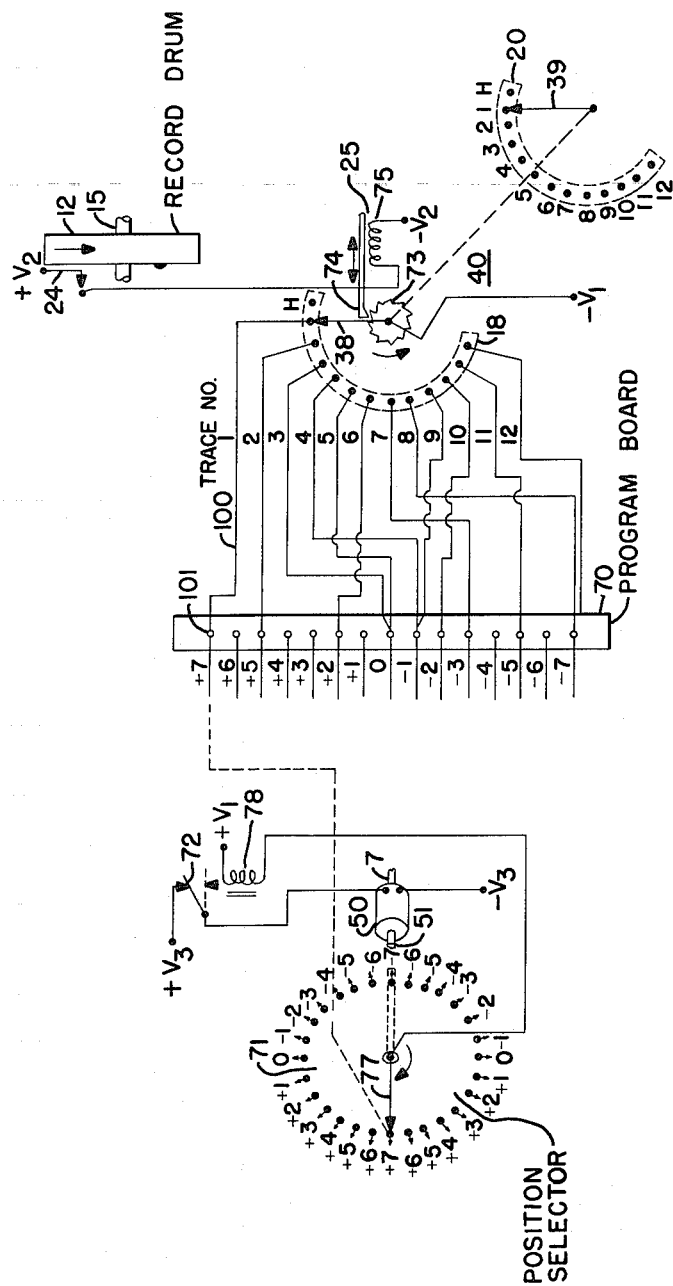

FIGURE 2 illustrates in detail a schematic arrangement of the mechanical and electrical components required to apply the features of this invention to one of the corrective components of the apparatus in FIGURE 1. Expressed otherwise, this figure illustrates schematically the manner in which the invention may be used to automatically preprogram and enter the static corrections for each trace of the seismogram processed by the apparatus shown in FIGURE 1.

Before entering into a detailed consideration of the above figures, it is well to note that several terms in the following description are assumed to have the following meanings for the purposes of the description. Thus, the term reproducible seismogram is intended to mean a multi-trace reproducible recording of a plurality of geophone signals from a seismic observation. The seismogram is deemed in this description to contain a reference or zero time signal, preferably in the form of a time break signal and signal trace. The term reproducible is intended to mean that the trace information may be translated into trains of electrical signals by scanning the traces with a suitable reproducing device or means. For example, in the case of a magnetic-type seismogram, a suitable reproducing or recording device would be a magnetic head.

The term recording medium or record medium in this description is intended to mean either a non-reproducible or a reproducible type record medium such as paper or photographic film, respectively, adapted to receive seismic information.

The term seismic trace or channel is intended to mean the record formed on a record medium by reception of a train of signals from an individual geophone location. Each trace is in effect a record with time of the occurrence and magnitude of the signals received. It will be noted at this point that most seismic records are capable of recording simultaneously twenty or more trains of signals from as many geophone locations. In some instances, one geophone location may actually consist of a plurality of geophones connected together to form one signal.

The term seismic signal is intended to mean the electrical signal formed by a geophone or other seismic transducer in response to the reception of seismic energy or waves. It is also intended to mean the electrical signals that are formed by reproducing a seismic trace from a reproducible record medium. It is further deemed to mean the "pure" seismic signal, divorced from any carrier signal and the like. In the event that a seismic trace is actually a recording of a carrier wave modulated by a seismic signal, it will be assumed that the seismic signal is isolated from the carrier wave in the reproduction process.

The term seismic section shall be intended to mean a seismogram prepared from one or more field seismograms in which the individual seismic traces have been corrected for one or more seismic corrections. The individual traces that form the section are arranged in the same lateral order as the geophone locations corresponding to the traces; and the widths of the traces are preferably proportional to the distances between the geophone locations so as to render the final product a reasonably accurate map or vertical cross section of the portion of the earth under study. Since the vertical dimensions of the information on the section are actually "time" information, it will be recognized that any lateral or other measurements obtained in the form of conventional linear units must be rendered consistent with the time information on the vertical scale, as by the application of seismic velocity information. Such procedures, of course, are well known to persons skilled in the art; and a detailed discussion of this type of operation is not considered to be a necessary part of this description.

Having thus briefly indicated the general meanings of some of the terms to be used in the following discussion, attention is now directed to FIGURE 1 of the attached drawing which illustrates a commercially available playback system adapted to receive a magnetic tape-type seismogram and to prepare a seismic section from one or more such seismograms.

The apparatus is essentially a schematic representation of a unit which is manufactured by Electro-Technical Labs of Houston, Texas. This unit has been described in an article in the Oil and Gas Journal, vol. 54, No. 78, October 29, 1956, page 70.

The apparatus illustrated in FIGURE 1 includes a seismogram drum 12, a correction drum 13 and a section drum 14, all mounted on and driven in unison by shaft 15. Shaft 15 is in turn driven by an electrical motor or other conventional power source not shown.

Seismogram drum 12 is provided with a multi-head reproducing means 20, each head being adapted to playback or reproduce one of the seismic traces on the seismogram.

It will be noted in the figure that the ends of the seismogram tape on the drum come together at a point 10; and it will further be noted that all tapes when mounted on the drum are mounted in a manner such that the shallow recording portions of the tapes are reproduced before the deep portions.

Reproducing means 20 are connected electrically with contact arm 39 of trace selector 40 which in effect is a pivoted contact arm adapted to contact separately each head of the reproducing means. Signals received by the trace selector from the reproducing means are transmitted by suitable electrical circuit means to the recording head 17 on the correction drum 13. Head 17 in the commercial version of the apparatus in FIGURE 1 serves the function of incorporating static seismic corrections in each trace which is reproduced from the seismogram drum 12 and transmitted to the correction drum 13. The actual mechanism used in the commercial apparatus for adjusting the position of head 17 is not illustrated in FIGURE 1. Instead, a more schematic and simplified version of the actual apparatus is illustrated there. The simplified version includes an arm 27 which is pivotally supported by shaft 15 and which supports head 17 at one end and an arcuate gear segment 11 at its other end. Gear segment 11 meshes with a linear gear segment 9, and the latter segment is attached to a traveling nut 8 which moves along reversing-type lead screw 7 in response to rotation of the latter member by motor 50. Thus, movement of the nut 8 back and forth on the lead screw 7 causes head 17 to move back and forth along the periphery of drum 13 in relation to head 19. By suitably calibrating linear movements of the traveling nut 8, it is possible to adjust the position of head 17 for any given seismic trace in terms of time displacement so as to incorporate static time corrections within the trace. It should be noted at this point that a motor 50 is not used on the actual commercial apparatus and the motor in itself forms one component of the improvement which constitutes the subject matter of the present invention. On the commercially available unit, the adjustment of the position of head 17 is achieved by means of a hand actuated crank which moves the traveling nut 8 along the lead screw 7.

After head 17 has started to record a trace on drum 13 in response to signals received from reproducing means 20, the trace on drum 13 moves around with the drum until it comes under head 19. This head reproduces the trace and transmits the resulting signals via electrical circuit means 30 to recording device 21. The latter device is of a character to form a record of the signals in the form of trace information on the recording medium which is placed on drum 14. As indicated earlier, recording device 21 may be any one of several conventional seismic recording devices adapted to form a trace recording on whatever record medium is placed on the section drum. For the purposes of this description, it will be assumed that the recording device is an oscillographic pen and that ordinary recording paper is mounted on the section drum.

Reproducing head 19 in the commercial version of the apparatus of FIGURE 1 functions not only to reproduce the trace information on drum 13 but also to incorporate any dynamic or variable time corrections which are necessary or desirable in the trace information. Thus, in both the commercially available unit and also in the simplified unit illustrated in the figure, means are provided for continually adjusting the position of this head relative to head 17 throughout the recording of each trace. And, as in the case of the movement of head 17, the mechanism illustrated in the figure for effecting proper movement of head 19 varies somewhat in form, but not in principle, from the mechanism employed in the commercial version.

In FIGURE 1 head 19 is indicated to be mounted on arm 52, which like arm 27, is pivotally supported by shaft 15. The opposite end of arm 52 terminates in a cam follower 41 which rides along the outer surface of an axially adjustable, three-dimensional cam 42.

As is apparent in FIGURE 1, the movement of head 19 along drum 13 depends upon both the axial and the radial points of contact between cam follower 41 and cam 42. Assuming that cam 42 is provided to incorporate "spread" or "step-out" corrections within each trace on drum 13, it will be recognized by persons skilled in the art that the radial contour of the cam must be a function of the distance along any given trace; and the position of any particular radial contour along the axis of the cam must be a function of the distance from the shot point to the geophone location corresponding to the trace. Thus, by properly calibrating the contour and the length of cam 42 to be consistent with the units of measurement for the seismogram and the seismic section, it is possible to select a given position along the length of the cam for the cam follower 41 to contact such that revolution of the cam continuously moves head 19 in a predetermined manner adapted to incorporate a spread correction within any given trace on drum 13.

In the commercial version of the equipment in FIGURE 1, the position of the cam follower 41 on the cam 42 would in effect be determined or effected manually, and the cam would then be rotated as by means of chain 43 and equidiameter sprockets 44 and 45. In the apparatus of the figure, however, movement of cam 42 along its lengthwise axis is obtained automatically by means of arm 46 which engages traveling nut 47. Nut 47 in turn runs back and forth along lead screw 48 in response to the action of motor 49. This motor, the arm, the lead screw and the traveling nut may be considered in the present invention to comprise automatic means for positioning cam 42 at a predetermined point below and in contact with cam follower 41. Actual control of motor 49 as well as the previously mentioned motor 50 is effected in a manner and by apparatus to be considered and described at length hereinafter. It will be noted that suitable gear reducers 56, 57 and 58 may be used in conjunction with the motors 49, 50 and 61, respectively, as necessary to provide whatever relative rotational speeds are required to drive both the lead screws and the position selectors associated with the various motors.

As the head 19 reproduces a seismic trace on drum 13, the resulting seismic signals, as indicated earlier, are transmitted to recording means 21 to adjacent drum 14. Recording means 21 in response to the signals received generates a trace, in this instance on oscillographic-type inked trace, on the recording medium on the drum.

The position of recording means 21 along the axis of drum 14 is determined by its position on screw 60. In the commercial version of the illustrated apparatus, the recording means is threaded to receive the screw, and the screw is rotated by hand until the recording means is positioned at the desired point along the length of the drum. As mentioned earlier, the position from one trace to the next is preferably adjusted to correspond to the actual distances prevailing between the corresponding geophone locations responsible for the traces. The distances between the traces are furthermore made consistent in time units with the lengths of the traces by incorporating seismic velocity information in a known manner.

At this point it should be noted that the velocity of seismic waves frequently varies in depth within any particular portion of the earth. In most instances the variations are reasonably small; and a single velocity value may be conveniently assumed for an entire cross section of the earth at that point. In other instances, however, it may be more desirable to actually use the different velocity characteristics that actually prevail throughout a section of the earth. The apparatus illustrated in the figure may be readily modified to incorporate corrections occasioned by velocity variations. For example, the contour of cam 42 may be altered; or alternatively, an entirely separate cam containing the velocity information may be inserted in the present cam and cam follower arrangement to provide this correction. Such modifications are deemed to be well within the ability of persons skilled in the art.

As in the case of heads 17 and 19, the position of head 21 in accordance with the present invention is attained automatically with the aid of a motor 61. The use of these motors and the functions they perform in attaining the objects of the present invention are now to be considered in this description. Accordingly, attention is now directed to FIGURE 2 which presents a schematic illustration of an apparatus of a character to program and automatically actuate head 17 so as to incorporate predetermined static time corrections in each trace of seismic information on seismogram drum 12 as the traces are reproduced therefrom and thereafter recorded on section drum 14.

Before proceeding into a detailed discussion of all components of the apparatus in FIGURE 2, it is important to note that certain components are common to both FIGURES 1 and 2. Thus, each figure includes record drum 12, contact 24, sequence control means 25, motor 50, lead screw 7, shafts 51 and 15, head bank 20 and contact arm 39.

Additional components in the apparatus of FIGURE 2 include program board 70, position selector 71 and relay contacts 72.

Trace selector 40, it will be observed in FIGURE 2, may be a dual bank step switch, each bank being illustrated to contain 13 electrical contact points. Bank 20 comprises contact points H and 1–12 inclusive, the numeric contact points corresponding to traces 1–12 repectively on the seismogram. The contact point identified by the legend H is designated to be the "home" contact and constitutes the position to which the contact arm 39 returns after it has sequentially contacted each numerical contact. It will be noted at this point that step switches of the type illustrated are well known items of manufacture. For example, a suitable such switch is manufactured commercially by C. P. Clare and Company, Illinois.

The second bank 18 of the trace selector 40 is connectable by suitable electrical circuit means, e.g., stacking jack plugs and associated leads 100 to preselected jack socket positions 101 on program board 70. The selection as to which jack socket should be connected to which contact point on the bank 18 will be made more apparent later in this description. At this point it is important to note that contact arms 39 and 38 of the banks 20 and 18, respectively, of the trace selector are mechanically interconnected and are stepped from contact to contact in unison.

Stepping of contact arms 38 and 39 may be achieved in any one of several conventional ways. The particular means illustrated in FIGURE 2 for this purpose includes a ratchet wheel 73 and solenoid-actuated pawl 74. Thus, energization of solenoid 75 by closure of contact 24 causes the ratchet 74 to rotate the ratchet wheel 73 in the manner indicated, the pawl being adapted to move the wheel one contact point for every energization of the solenoid.

Diverting attention for the moment to contact 24, it will be observed in FIGURES 1 and 2 that the arm of this contact is pivotally mounted; and closure of the contact is obtained by engagement of the free end of the arm with cam 76 mounted on the side of drum 12. Thus, every revolution of drum 12 causes cam 76 to strike against the free end of the arm member of contact 24 and to close the circuit supplying electrical power to the solenoid 75. As particularly illustrated in FIGURE 1, closure of the contact 24 is preferably set to occur at a point near the end of each trace. Closure of the contact at this point sacrifice a relatively small portion of the information on the tape, the information sacrificed being that of least interest on the record. It will be recognized, of course, that the drum 12 may be made sufficiently large in comparison to the length of the magnetic tape to insure complete playback of all information on every trace of the tape.

Turning next to motor 50 in FIGURE 2, it may be seen that this motor is adapted to run continuously until relay 72 is opened by energization of solenoid 78. Accordingly, traveling block 8 is continuously driven back and forth along the reversible lead screw 7 until such time as the action of the motor 50 is interrupted by relay 72. Energization of the solenoid, a closer examination of FIGURE 2 will reveal, occurs when the circuit is completed from $-V_1$ through contact arm 38 of the trace selector, an appropriate jack socket connection in the program board 70 and thence through a contact point on the position selector 71, contact arm 77 and thence through the solenoid to the terminal $+V_1$. It will further be recognized that a wide variety of such circuits may be completed, depending upon preselection of various electrical connections in this circuit. The precise circuit connection to make for any given trace on the seismogram is governed by the magnitude of the static correction to be imparted to the trace. The selection is made and governed by the following factors and apparatus features.

Turning first to the position selector 71, it may be seen that this selector is essentially a multi-contact switch ranging in numerical values from 0 to $+7$ and return and then from 0 to $-7$ and return. It will further be noted that contact arm 77 is mounted upon and rotates with shaft 51 which is in turn rotated by motor 50. Thus, assuming the 0 contact position to correspond to the midpoint of travel of traveling nut 8 along lead screw 7, it will be recognized that the $+7$ value corresponds to the extreme limit of travel of traveling nut 8 in one direction along the lead screw; and the $-7$ value corresponds to the maximum limit of travel in the opposite direction. The plus and minus values intermediate 0 and $+$ and $-7$ respectively, correspond to spaced points along the lead screw positioned between the limits of travel of the traveling nut 8.

The 0 contact position on the selector and the midpoint of travel of nut 8 on lead screw 7 therefore serves admirably to position head 17 in relation to head 19 and head 21 so that a zero static correction is entered into any trace recorded on and thereafter reproduced from drum 13. The plus contact positions correspond to progressively increasing static corrections to one side of an assumed datum; and the negative contact positions correspond to progressively increasing static corrections on the opposite side of the assumed datum. Furthermore, each contact position may be calibrated to represent so many feet or so many milliseconds of time. In other words, preselection of a contact point on the position selector enables the operator of the equipment to automatically position head 17 in proper relation to head 19 and head 21 so as to incorporate a proper static correction value for any given trace.

To incorporate the desired static correction for any given trace, it is only necessary to connect the proper position on the position selector 71 to the proper trace contact position on bank 18 of the trace selector 40. Conversely, as the ratchet wheel 73 advances once for every revolution of drum 12, it is only necessary by preselection to connect the proper trace contact point on bank 18 of the trace selector to the proper contact position on the position selector. This is done merely by inserting the jackplug connecting the lead wire 101 to the trace contact point to the proper jack box connection on program board 70. For example, in FIGURE 2 trace contact 1 for trace No. 1 of the seismogram on drum 12 is indicated to be connected through the $+7$ correction point of the program board and the position selector. Hence, this trace will receive a maximum static correction in being transposed from the seismogram drum to the section drum. Similarly, traces 8 and 12 are programmed to receive a maximum static correction of an opposite sign; traces 3 and 5 are programmed to receive no static correction; and the remaining traces are programmed to receive intermediate degrees of correction.

To recapitulate and summarize briefly, then, each revolution of record drum 12 causes the trace selector to advance one trace and to substantially instantaneously cause motor 50 to interrupt contact arm 77 at a position corresponding to a point designed to incorporate a predetermined desirable static correction in trace 1.

Turning now to heads 19 and 21, it will be recognized that programming and correction mechanisms substantially identical with the mechanism just described for head 17 are employed in connection with these two heads with minor obvious variations. Thus, in the case of head 19, it will be recognized that in substantially all seismic observations involving a plurality of geophone locations, all of the spread corrections will have the same sign in that geophone locations progressively remote from the seismic shot point will have progressively larger spread corrections for a given depth. In other words, traces having the least seismic corrections call for cam follower 41 to be positioned toward the smaller end of cam 42. Conversely, traces requiring progressively larger spread corrections require the cam follower to be positioned near the larger end of the cam 42. It follows, then, that the program board and position selector used in conjunction with lead screw 48 and traveling nut 47 should in all instances have all corrections of the same sign.

Turning next to recording means 21, it will be recognized that the primary distinction between the operation of this mechanism in conjunction with screw 60 and the operations of the nuts 3 and 47 with respect to the lead screws 7 and 48, respectively, lies in the fact that device 21 does not continuously travel back and forth along screw 60. Instead, it is desirable that the device travel the length of the screw once, stopping at predetermined points corresponding to the relative positions of the geophone locations responsible for the various traces. This action of the device 21 and the screw 60 may be realized in one of several ways. For example, as with the other two position selectors and program boards, a plurality of positions or contact points may be employed, each position on the position selector and each point on the program board corresponding to a particular position along the screw. In this system one revolution of the position selector is all that is required during a complete scan of one seismogram by the recording means 21 along drum 14.

An alternate and preferred way of actuating head or recording means 21 relative to screw 60 lies in placing a clutch in combination with the gear reducer 62 between the motor 61 and screw 60. The clutch allows the screw 60 to be rotated to the desired position and stopped by a suitable program. The clutch is then released by a suitable relay and the motor 61 reversed and returned to zero and stopped. Then when switch 28 closes in preparation for recording the next seismic trace on drum 14, screw 60 is again rotated to the desired position and stopped by the program board similar to 70. The clutch is released and the motor returned to zero as previously described.

Considering reproducing means 19 and recording means 21 for the moment, it will be recognized that head 19 and recording means 21 may be still occupied with one trace of a seismogram, while head 17 and head bank 20 may have completed that trace and are in the process of working on the next trace in the playback sequence. Accordingly, it is desirable to have a delay arrangement such that the head 19 and recording means 21 may complete their work on any given trace, while a new trace is being subjected to the actions of heads 17 and reproducing means 20. Such a delay may be arranged in any one of several ways, a convenient and satisfactory way being illustrated in FIGURE 1. Here it will be seen that an additional contact 28 is mounted adjacent drum 12 to be actuated by cam 76 at a time following closure of contact 24. The degree of delay between the closure of the two contacts is made consistent with the time interval or delay between the actions of heads 17 and 19 for reasons that are self-evident.

Turning again to FIGURE 1, as noted earlier, the mechanisms illustrated in FIGURE 2 are not shown per se in FIGURE 1. However, the mechanisms are schematically indicated by boxes in FIGURE 1. These boxes are identified by the legends 90, 91 and 92. The trace selector mechanism is symbolized by the box identified by the legend 25.

While the foregoing description and the attached drawing illustrate an embodiment of the invention contemplated to constitute the best mode of practicing the invention, it will be recognized that numerous variations and modifications may be incorporated therein without departing from the spirit or scope of the invention. For example, the apparatus may employ modulators, amplifiers, demodulators, driver circuits and the like as are necessary for satisfactory and suitable performance of the equipment. Again, the dynamic or spread correction mechanism in the apparatus may be replaced by the spread mechanism which is used in the commercial version of the apparatus referred to earlier in this description. Again, it is possible to reduce the number of drums in the equipment to two drums, a record drum and a section drum. In such an arrangement, the head bank 20 would serve not only to reproduce the traces on the record drum 12 but to replace the function of head 17 on drum 13. Similarly, the pickup head 19 on the correction drum would be moved into a corresponding position on the section drum 14. The static correction drive and preprogramming mechanism and the spread or variable seismic correction drive and preprogramming mechanism would have to be repositioned to adjust the head bank and the playback head, respectively.

Because of the complexity of the mechanical linkages of a two drum system and because with the three drum system described a single record head 17 and pick up head 19 are used as opposed to a multiple head 20 on drum 12, the three drum system is much preferred.

Other systems, it will be recognized, may be utilized for driving the correction heads. For instance, instead of using motors running in one direction, the program board could be set up to control the direction of rotation as well as its magnitude and hence materially reduce the time involved in positioning the correction heads for the various traces.

The corrections for each trace also could be punched on tapes or cards, and suitable tape or card reading devices provided in place of the simplified program board utilizing stacking type jacks described hereinbefore. Another alternative would be to provide a panel having a number of switches mounted thereon, one switch for each trace with the switch calibrated in terms of desired corrections. The operator could preset the switches to the corrections to be applied to the machine and then cause the machine to reproduce a corrected section automatically.

It will also be recognized that this apparatus may be provided with more than one of each of the various drums, i.e., the seismogram drum, the correction drum and the section drum. For example, two or more seismogram drums may be employed; and a drum selector as well as trace selectors then may be used to provide sequential seismogram reproduction as well as sequential trace reproduction.

Having considered in detail the structural components of the apparatus embodiment illustrated in the attached drawing, attention is now directed toward a description of the manner in which the apparatus may be operated. Thus, as indicated earlier, a field seismogram is mounted on record drum 12; and a recording medium in the form of paper is mounted on drum 14. The contact arms of banks 18 and 20 of the trace selector 40 are placed in the H contact positions; and the contacts or switches 24 and 28 are temporarily inactivated. Recording means 21 is positioned by hand at a point on the section drum where it is desired to initiate the recording of a seismic section. A clutch 55 may be provided to disengage the recording means 21 from the feed screw 60 to permit hand positioning of the recording means.

Following determination from actual field observations as to what corrections must be imparted to the traces on the seismogram, the jack plugs and associated leads 100 interconnecting the contact points of the trace selector with the programming board and position selector of each correction and positioning means, are placed in proper positions to incorporate the desired corrections within each trace on the seismogram. For example, the programming board of the correction mechanism associated with head 17 may be arranged as indicated in FIGURE 2. The program boards associated with the spread correction head 19 and the recording means 21 may be similarly arranged.

Once the preprogramming of the desired corrections has been accomplished, the various energizing relays may be closed; and the formation of a seismic section from the seismogram on the drum 12 may be initiated. Thus, the switches 24 and 28 may now be rendered operative in response to engagement with cam 76, after the drums and shaft 15 have been brought up to operating speed.

When the switches 24 and 28 are rendered operative, cam 76 in closing switch 24 causes pawl 25 to advance the ratchet wheel 73 one cog and to simultaneously cause contact arm 38 to move from the H contact position on bank 18 to the contact position corresponding to trace number 1. Simultaneously, contact arm 39 of bank 20 moves to the contact position on the head bank 20 adapted to reproduce trace number 1 on the seismogram.

The signals reproduced by the reproducing means 20 from trace No. 1 on the seismogram are transmitted to recording head 17 and are recorded on drum 13 as a trace. By employing a relatively high speed motor 50, the proper positioning of head 17 may be achieved before any substantial portion of the seismogram has been reproduced. Similarly, positioning of head 19 in response to the action of cam 41 and its associated positioning and correction device 91 may also be positioned before an undue period of time elapses. It will be recognized, of course, that the latter head is not urged into its desired position until contact 28 is closed by engagement of its pivoted arm with cam 76. It will further be recognized that head 19, by virtue of the time interval existing between it and head 17 may be placed into the desired corrective position in ample time to receive and reproduce the traces that head 17 lays down along the surface of drum 13.

After each trace on drum 13 has been reproduced by the reproducing head 19, the resulting signals are transmitted to the recording means 21. The recording means, it will be apparent, will have been placed into its desired operative position in response to its particular correction and positioning means 92 and also in response to closure of switch 28. Thus, recording means 21 records the signals received from head 19 in an automatic manner along the recording medium on the section drum.

As drum 12 continues to rotate, it will be apparent that cam 76, following playback or reproduction of trace No. 1, again engages and closes switch 24 and thereby causes reproduction of trace No. 2 on the seismogram in substantially the same manner as trace No. 1. The process is repeated until the entire seismogram has been scanned and converted into a seismic section. At that time the apparatus may be manually or automatically turned off in any conventional manner.

We claim:

1. In seismic recording or reproducing apparatus including means for mounting a reproducible record medium, and a transducer mounted adjacent said record medium in a manner to enable repeated trace-recording or trace-scanning motions between said transducer and said record medium, the improvement which comprises a reversing-type lead screw, a traveling nut on said lead screw, means coupling said traveling nut with said transducer to move said transducer along a trace on said record medium in response to motion of said traveling nut along said lead screw, motor means adapted to rotate said lead screw and thereby move said traveling nut and said transducer, positioning means actuatable during separate scanning motions between said transducer and said record medium to start and stop said motor means at different positions of said traveling nut along said lead screw, and programming means operable in response to a sequence of separate scanning motions between said transducer and said record medium to actuate said positioning means at a corresponding preselected and variable sequence of positions of said traveling nut along said lead screw.

2. In seismic recording or reproducing apparatus including a rotatable drum adapted to have a reproducible record medium on its cylindrical surface, a transducer supported adjacent said drum in a manner to record or reproduce trace information on said record medium upon rotation of said drum, means to rotate said drum past said transducer, and drive means to move said transducer in a limited path along a trace on said record medium, the improvement which comprises positioning means cooperable with said drive means to position said transducer at different points along said path, and programming means operable upon a sequence of rotations of said drum to actuate said positioning means at a corresponding sequence of preselected and variable positions of said transducer along said path.

3. In seismic recording or reproducing apparatus including a rotatable drum adapted to have a reproducible record medium mounted around its cylindrical surface, a transducer supported adjacent said drum of a character to record or reproduce trace information on said record medium upon rotation of said drum, and means to repeatedly rotate said drum, the improvement which comprises drive means adapted to move said transducer continuously back and forth in a limited arcuate path along a trace on said record medium, positioning means to interrupt the action of said drive means so as to position said transducer at different points along said arcuate path, and programming means operable in response to a sequence of rotations of said drum to actuate said positioning means at a preselected and variable sequence of positions of said transducer along said arcuate path.

4. In seismic recording or reproducing apparatus including a rotatable drum adapted to receive a reproducible record around its outer surface, a transducer supported adjacent said drum and adapted to record or reproduce trace information thereon, and drive means to move said transducer in a path around the periphery of said drum, the improvement which comprises positioning means operable to stop said drive means so as to position said transducer at different points along said path, and programming means operable in response to separate rotations of said rotatable drum to actuate said positioning means at a preselected and variable sequence of positions of said transducer along said path.

5. In an apparatus for reproducing a multi-trace reproducible seismogram in a trace-by-trace manner and re-recording the reproduced traces, including correction means for entering corrections within the reproduced traces, trace-selector means to reproduce said traces in a preselected sequence, and drive means to vary the magnitude of the correction entered by said correction means, the improvement which comprises correction-selector means operable upon the reproduction of each said trace to fix the magnitude of the correction entered by said correction means within said trace, and programming means coordinating the sequence of operations of said correction-selector means with said trace-selector means so as to enter a preselected correction for each said trace during the reproduction of said trace.

References Cited in the file of this patent
UNITED STATES PATENTS

| | | | |
|---|---|---|---|
| 2,416,445 | Jensen | Feb. 25, | 1947 |
| 2,671,375 | Boucher | Mar. 9, | 1954 |
| 2,683,254 | Anderson | July 6, | 1954 |
| 2,706,118 | Camras | Apr. 12, | 1955 |
| 2,800,639 | Lee | July 20, | 1957 |
| 2,803,515 | Begun | Aug. 20, | 1957 |
| 2,821,576 | Gaubert | Jan. 28, | 1958 |
| 2,832,841 | Eldridge | Apr. 29, | 1958 |
| 2,838,743 | Fredriksson | June 10, | 1958 |
| 2,861,507 | Palmer | Nov. 25, | 1958 |
| 2,876,428 | Skelton | Mar. 3, | 1959 |
| 2,907,008 | Krieger | Sept. 29, | 1959 |
| 2,938,195 | Begun | May 24, | 1960 |
| 2,953,383 | Walters | Sept. 20, | 1960 |
| 2,958,849 | Begun | Nov. 1, | 1960 |
| 3,012,223 | Begun | Dec. 5, | 1960 |